Patented June 27, 1950

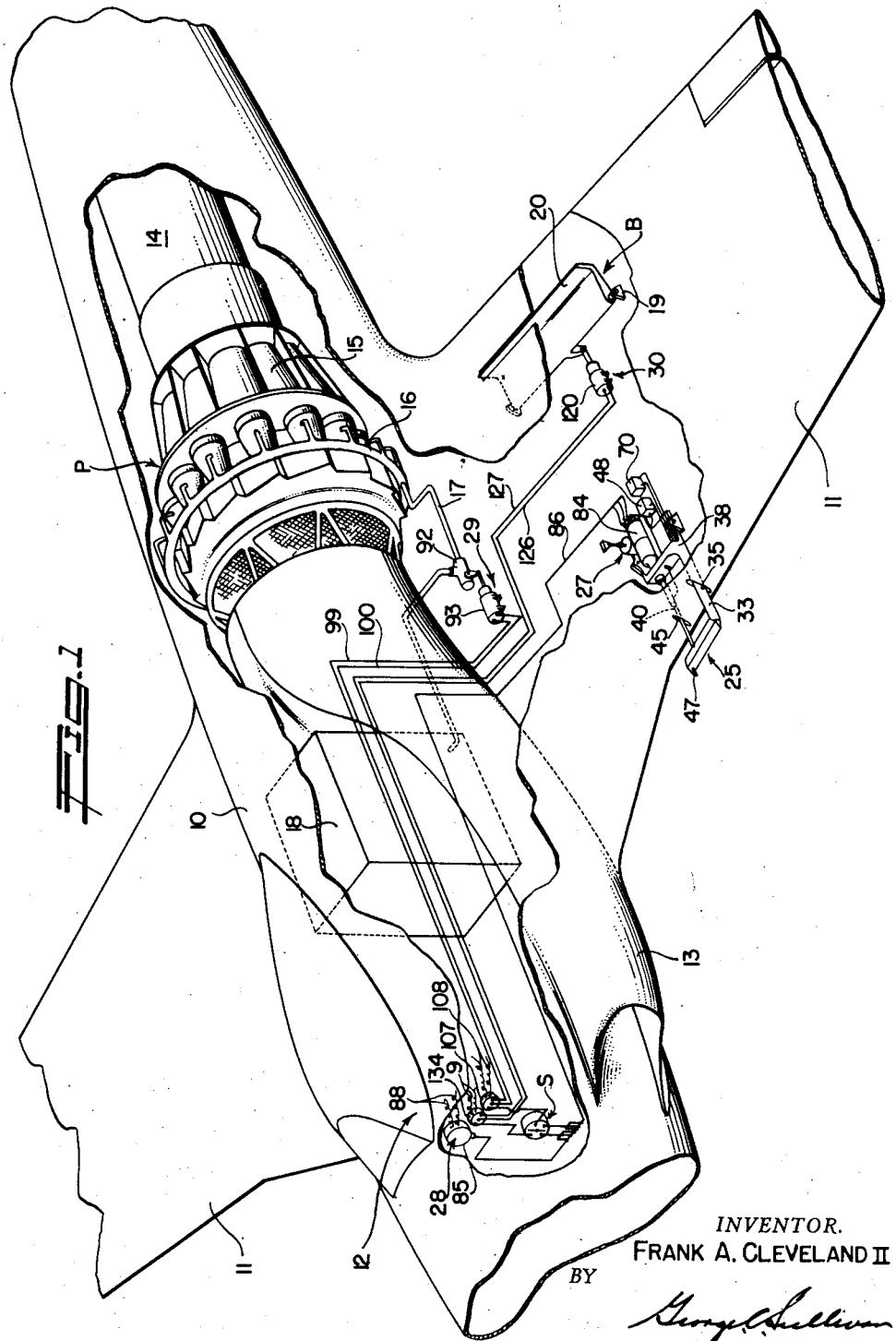

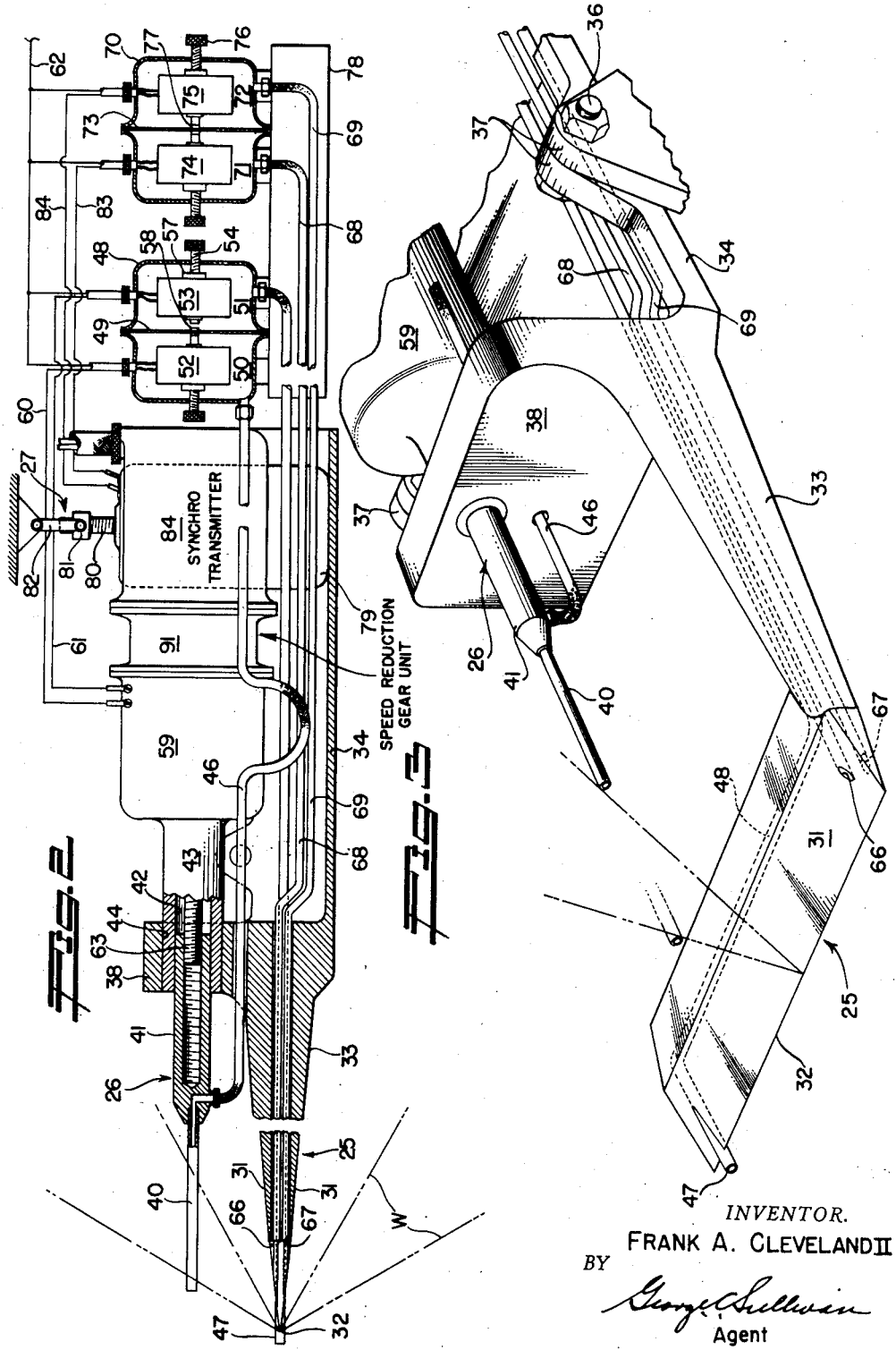

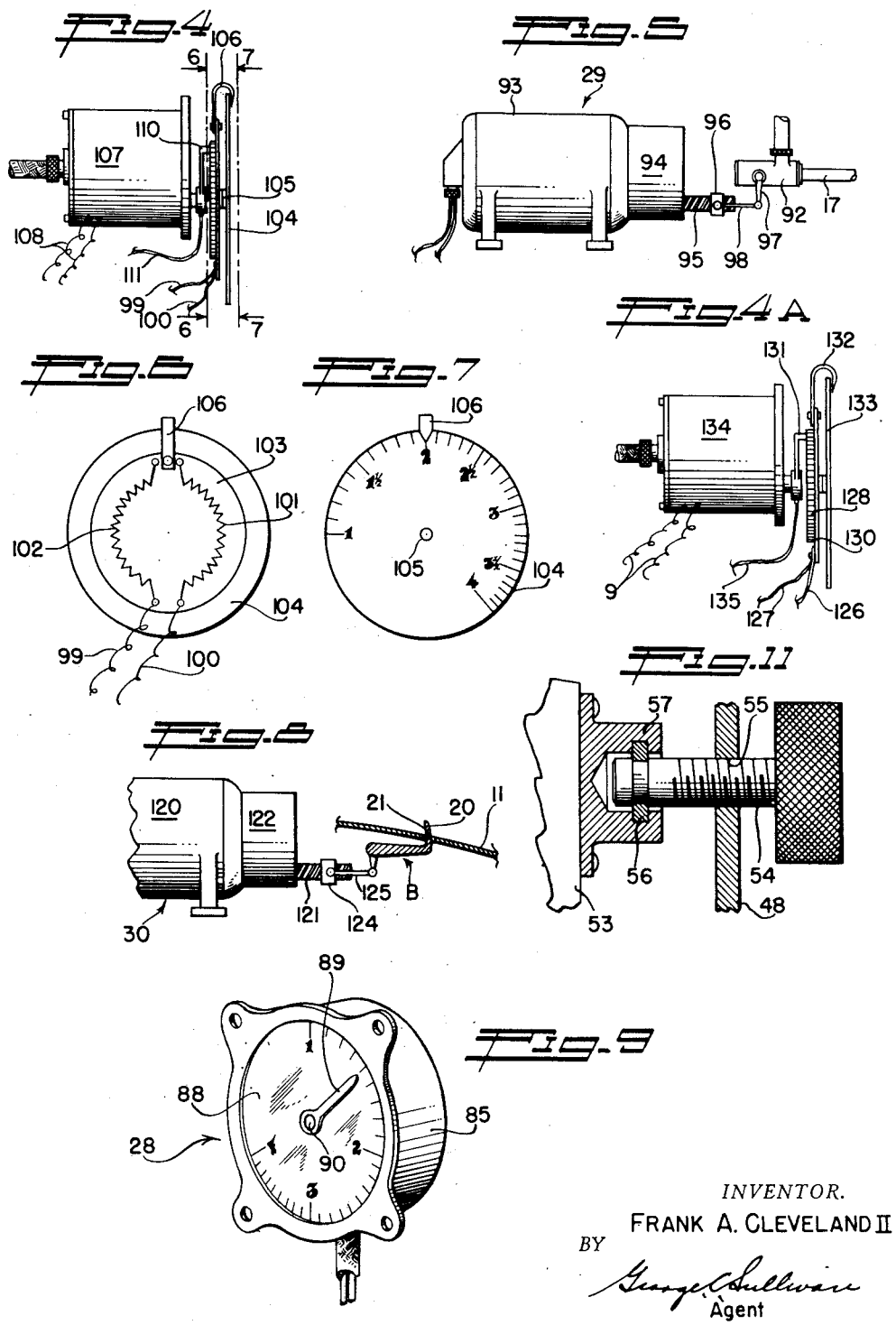

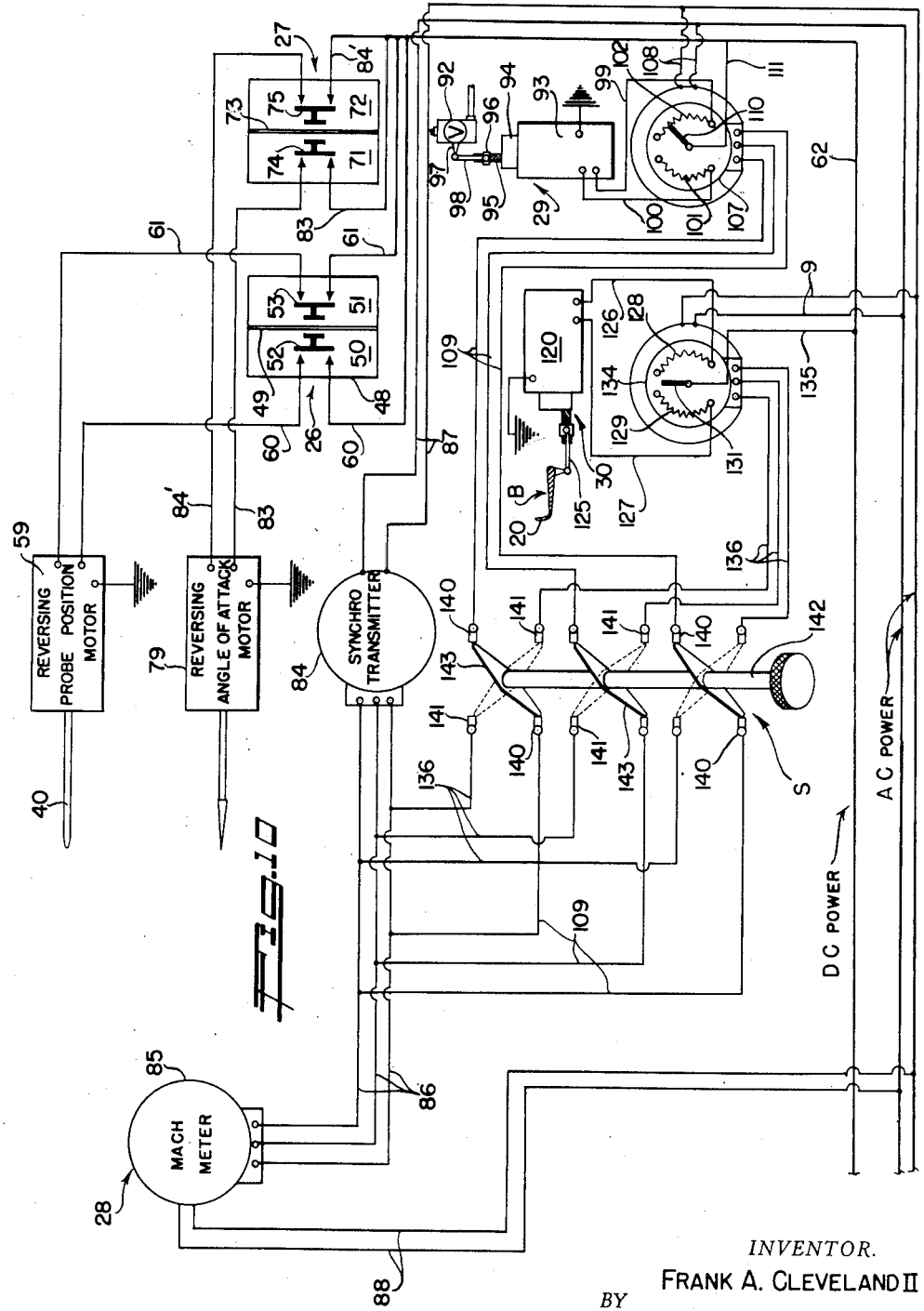

2,512,790

UNITED STATES PATENT OFFICE 2,512,790

CONTROL AND INDICATOR FOR SUPERSONIC VEHICLES

Frank A. Cleveland, II, Pasadena, Calif., assignor to Lockheed Aircraft Corporation, Burbank, Calif.

Application January 9, 1948, Serial No. 1,363

22 Claims. (Cl. 244—76)

This invention relates to airborne craft such as airplanes and guided missiles designed for supersonic flight, and relates more particularly to controls and velocity indicators for such aircraft.

When an airborne craft operates at a speed in excess of the speed of sound, that is in the supersonic region, the conventional air speed indicators are no longer capable of measuring the air speed due to compressibility effects and shock phenomena. At supersonic velocities the total head tube of a conventional indicator indicates a total pressure value considerably below the true value and the static pressure orifices do not provide a true ambient static pressure reading. Even assuming that the head tube and the static pressure tubes are capable of correctly reading the true pressures, the difference in these pressures during supersonic flight is no longer a definitive function of air speed either indicated or true and this error, which begins below the speed of sound, increases in magnitude as the velocity of the craft increases. A calibrated chart might conceivably be employed to correct the error but such a chart would be useful only if the ambient static pressure could be accurately determined which is extremely difficult at supersonic speeds.

In the operation of an airplane, and more particularly in the case of a guided missile, there are certain operations and functions which may be controlled by or made dependent upon the translational velocity of the craft. For example, in the case of a guided missile powered by a ram jet engine or a turbo powerplant, the velocity and mass of the reactive propulsive jet of gases and air may be regulated to maintain a desired or predetermined speed of flight. Such regulation may well be accomplished by varying the fuel supplied to the engine in accordance with the actual speed of flight. Another example is an air brake system that is responsive to the velocity of the craft. Without a device that is capable of accurately determining the translational velocity in the sonic and supersonic regions, it is, of course, impossible to properly control such functions either automatically or through the medium or intervention of a human pilot.

The pilot and aerodynamast interested in the design, operation and characteristics of craft intended for supersonic flight are concerned primarily with the Mach number of the craft, that is the ratio of local velocity to the local velocity of sound, and the so-called true or indicated air speed is of little or no significance. Accordingly, it is a primary concern to accurately determine the Mach number of such a craft during flight.

It is an object of the present invention to provide a practical, effective, and dependable device or means for accurately determining and/or indicating the Mach number of craft traveling at supersonic velocities. The device of the present invention is useful as a Mach meter which provides a visible reading or indication of the speed of the craft and may, additionally or alternatively, serve as a control for initiating or governing actuation of other instrumentalities of the craft such as the powerplant, air brakes, etc.

Another object of the invention is to provide a device of the character referred to that determines the Mach number of the missile or craft by sensing the position of a supersonic shock wave whose position is solely and exclusively a true indication or direct function of the Mach number of flight. When a total pressure tube, such as employed in a conventional air speed indicator, is placed in a supersonic airstream, a shock wave forms directly in front of the tube and the total pressure in the region behind the wave occupied by the tube is much lower than the true free stream total pressure. This differential between the pressure received by the tube and the total pressure of the true free stream increases as the Mach number increases. It is this phenomena that exists when a conventional air speed indicator is used at supersonic velocities. In the present invention on the other hand, a substantially wedge shaped object is placed in the air stream to generate a shock wave and the angle of this wave with respect to the free stream is always a function of the half angle of the wedge and the free stream Mach number or speed. Since the half angle of the wedge is known and constant, measurement of the shock wave angle determines the Mach number of the free air stream. Accordingly, the device of the invention, by sensing the position of the shock wave angle, accurately senses and measures the Mach number of flight of the aircraft.

Another object of the invention is to provide a device of the character mentioned embodying means for automatically compensating for changes in the angle of attack of the airplane or vehicle. When the angle between the free air stream and the above referred to wedge changes, that is when there is a change in the angle of attack, an error is introduced into the indications unless provision is made to correct or compensate for this change. The present invention embodies means for automatically maintaining the wedge at a substantially zero angle of attack even during changes in the angle of attack of the vehicle or craft, thus assuring accurate functioning of the above mentioned shock wave sensing mechanism. Static pressure taps are provided at the opposite sides of the wedge to sense the angle of attack of the wedge and the pressures thus obtained are employed to control a mechanism for moving the wedge in a manner to preserve it in the zero angle of attack position.

A further object of the invention is to provide a fuel control for the propulsive engine of an airborne vehicle that senses and responds to the Mach number of the vehicle to regulate the fuel supplied to the engine. The fuel control system may be manually or mechanically adjusted to a selected Mach number setting and will thereafter sense or "read" the Mach number of the craft and regulate the delivery of fuel to the engine accordingly to preserve a Mach number corresponding to the setting thus selected.

A still further object of the invention is to provide an air brake regulating system that automatically responds to the Mach number of flight of the craft. The system utilizes the above mentioned shock wave sensing mechanism and automatically governs the position or extent of projection of the air brake elements in accordance with the Mach number indications thus obtained. The system may be manually or mechanically adjusted to produce the desired action of the brake elements at the selected Mach number settings.

Other objectives and advantages of the invention will become apparent from the following detailed description of a typical preferred form of the invention throughout which description reference is made to the accompanying drawings wherein:

Figure 1 is a more or less diagrammatic fragmentary perspective view of an airplane embodying the mechanism of the present invention with the overlying portions of the airplane broken away to illustrate the elements of the mechanism;

Figure 2 is an enlarged vertical sectional view of the shock wave sensing elements and related mechanisms with certain parts appearing in side elevation;

Figure 3 is a perspective view of the shock wave sensing mechanism with the rear portion of the same broken away;

Figures 4 and 4A are enlarged side elevations of the signal receivers and the associated adjusting mechanisms;

Figure 5 is an enlarged side elevation of the actuator for the fuel control system;

Figures 6 and 7 are elevational views of the rheostat and adjusting dial respectively taken as indicated by lines 6—6 and 7—7 on Figure 4;

Figure 8 is a fragmentary side elevation of the air brake actuating device;

Figure 9 is a perspective view of the Mach meter;

Figure 10 is a wiring diagram of the circuits embodied in the apparatus; and

Figure 11 is an enlarged sectional view of one of the switch adjusting means.

In the drawings I have illustrated the invention embodied in or applied to an aircraft propelled by an internal combustion turbo powerplant of the reactive jet type. The apparatus of the invention, as illustrated, is operable to provide a visible indication of the supersonic velocity or Mach number of the craft, to control or regulate the delivery of fuel to the powerplant P and/or to regulate one or more air brakes B. It will become apparent from the following detailed description that the invention is capable of other adaptations and applications and, therefore, is not to be considered as confined to the particular embodiment and application herein disclosed.

The portion of the aircraft illustrated includes a body or fuselage 10 provided with wings 11 and housing the powerplant P. The aircraft may be considered as carrying a human pilot and the fuselage 10 is provided with a pilot's cockpit 12. The powerplant P has air intake ducts 13 for receiving ram air and an exhaust nozzle 14 for discharging the combustion gases and compressed air in the form of a reactive propulsion jet. The engine P also has a plurality of combustion tubes or chambers 15 supplied with a suitable fluid fuel by a ring manifold 16 which, in turn, is supplied with the fuel by a line or pipe 17. The pipe 17 leads to a suitable source 18 of fuel, diagrammatically illustrated in Figure 1. The details and construction of internal combustion turbo powerplants of the type illustrated are now well known to those skilled in the art and have been omitted from the present disclosure as unnecessary to a full understanding of the invention.

Figures 1 and 8 illustrate in a more or less diagrammatic manner, an air brake B pivoted in a wing 11 at 19. The brake B has an elongate out-turned part 20 adapted to project through a slot 21 in the skin of the wing 11 so as to extend into the slip-stream. The braking effect obtained depends upon the amount of projection of the active part 20. It is to be understood that the brake B may be installed at any selected location on the aircraft and there may be two or more such brakes B, for example there may be a brake on each wing 11.

The apparatus of the invention may be said to include an element 25 positioned in the free air stream and operable to create a shock wave W during supersonic flight of the craft, means 26 for sensing the position or angle of the wave W, means 27 for adjusting the position of the means 26 to compensate for changes in the angle of attack, an indicator 28 responsive to the wave sensing means 26 to indicate the Mach number of the craft, means 29 responsive to the wave sensing means 26 for regulating the fuel supply line 17 of the powerplant P, and a means 30 for actuating or controlling the brake B also responsive to the wave sensing means 26.

The element 25 for producing the shock wave is arranged or positioned on the vehicle to be in the free air stream. In accordance with the invention, it is contemplated that the element 25 may be placed in any appropriate or selected location on the craft, for example it may be arranged on the forward end of the fuselage 10 or at the leading edge of the wing 11 or a vertical stabilizer. In the diagrammatic illustration of Figure 1, the element 25 is arranged ahead of the leading edge of a wing 11. The element 25 is in the nature of a wedge being a somewhat elongated part provided with upper and lower surfaces 31 which converge to a sharp forward edge 32. The shock wave W forms at this edge 32 and its angle is a direct function of the Mach number of flight, as will be more fully described. The wedge element 25 is carried by an arm 33 projecting forwardly from a mounting cradle 34. The cradle 34 is arranged within the wing 11 and the arm 33 projects forwardly through an elongated slot 35 in the wing skin to support the wedge element in front of the wing. For reasons which will later become apparent, the cradle 34 is mounted to tilt or pivot about a horizontal axis. In the arrangement illustrated, bolts or pins 36 engage in openings in lugs 37 on the cradle 34 and the wing structure to support the cradle for pivotal movement.

The cradle 34 has an upstanding flange 38 spaced ahead of its pivotal axis and the arm 33, which carries the wedge element, projects forwardly from the flange. It is to be understood that the mounting cradle 34 is preferably housed within the wing 11 or other part of the aircraft structure, while the wedge element 25 is carried by the arm 33 so as to be in the free air stream in front of the wing or other part of the craft.

The means 26 for sensing the angle of the shock wave W generated at the wedge element 25, is an important part of the invention and operates on the principle that the angle which the shock wave makes with the free air stream is a function of the half angle of the wedge element 25 and the relative velocity of the free air stream or Mach number. By sensing or determining this angle of the shock wave W the means 26 constitutes an accurate instrumentality from which the Mach number of the craft may be ascertained, the half angle of the wedge element being known and the Mach number being the variable factor. The means 26 includes a pressure receiving tube 40 which I will term a total head tube supported for fore and aft movement. The tube 40 is located at one side of the wedge element, being shown spaced above the element in the drawings, and is arranged so that it may follow the shock wave as its angle changes during flight. The forward end of the tube 40 is open to receive the head pressure at or adjacent the shock wave and the rear end of the tube is carried by a translatable member which may be in the form of an internally threaded sleeve or nut 41. The nut 41, in turn, is slidably and non-rotatably guided in the opening 42 of a guide 43. The guide 43 is supported in an opening 44 in the flange 38 so that the nut 41 extends forwardly beyond the flange, as shown in Figure 2. The total head tube and its supporting nut 41 extend through a slot 45 in the skin of the wing 11 so that the tube extends into the air stream in advance of the wing. A flexible line or tube 46 communicates with the rear end of the tube 40 and extends to a pressure sensitive unit, to be later described.

The means 26, for sensing the angle of the shock wave formed at the wedge element 25, further includes a second total head tube 47 for receiving or sensing the indicated free stream total pressure. The tube 47 has its open forward end projecting beyond the leading edge 32 of the wedge element 25, as best shown in Figure 3, to be in the free air stream. The tube 47 extends through an opening 48 in the wedge element 25 and arm 33 to pass rearwardly into the wing structure. The rear exposed portion of the tube 47 is preferably flexible.

When a tube, such as the tube 47, is arranged with its forward end in a free supersonic air stream, a bow wave forms in front of the tube and the pressure received or sensed by the tube is considerably below the true value, there being a substantial loss in pressure by reason of the bow wave. On the other hand, when such a tube is located behind a shock wave, such as generated by the wedge element 25, it is in a region of a lower Mach number and there is less loss as a result of the bow wave which forms in front of it. Accordingly, the pressure sensed by a tube behind the angular shock wave W is greater than that registered by a tube located in the free supersonic air stream and if the tube behind the shock wave W is moved forwardly, it senses progressively lower pressures until it passes into the free air stream where it receives the same pressure as the other tube. In the present invention, the tube 47 is located in the free supersonic air stream to sense or receive a pressure considerably below the true value while the tube 40 may be moved forwardly and rearwardly through the shock wave W to sense higher and lower pressures and thus sense or locate the position of the shock wave.

The means 26 further includes a pressure sensitive mechanism responsive to the pressures received by the tubes 40 and 47. This mechanism includes a sealed or closed pressure cell 48 partitioned by a transverse flexible diaphragm 49 into two chambers 50 and 51. The above described tube 46, leading from the movable total head tube 40, communicates with the chamber 50 while the indicated total head tube 47 communicates with the chamber 51. Switches 52 and 53 are adjustably supported in the chambers 50 and 51 respectively to be controlled or actuated by the diaphragm 49. Any appropriate means may be employed for adjustably supporting the switches 52 and 53 to be in the correct relation to the diaphragm. In the case illustrated in Figures 2 and 11, adjusting screws 54 are threaded through openings 55 in the wall of the cell 48 and have swivel or rotary connections 56 with bosses 57 on the switches. By simply rotating the screws 54, the switches 52 and 53 may be separately adjusted toward or away from the diaphragm 49. The diaphragm 49 may carry buttons 58 for engaging and actuating the control members of the switches.

The switches 52 and 53 serve to control a reversible electric motor 59 for moving the head tube 40 forwardly and rearwardly. As schematically illustrated in Figure 10, the switches 52 and 53 are interposed in the forward and reverse energizing lines 60 and 61 leading from a power line 62 to the motor 59. The screws 54 are manipulated prior to use of the equipment to adjust the positions of the switches 52 and 53 so that when the pressures in the chambers 50 and 51 are equal, and the diaphragm is in an intermediate undisturbed position, the switch 52 is closed by virtue of the engagement of the diaphragm button 58 with the control member of the switch. The shaft of the motor 59 has a screw threaded extension 63 which has engagement with an internal thread on the nut or sleeve 41. The circuit of the reversible motor 59 is such that the shaft extension 63 is rotated in the direction to move the head tube 40 rearwardly when the pressures in the chambers 50 and 51 are equal and the switch 52 is closed. The switches 52 and 53 are preferably of the type that require only minor movements of their actuation. For example, they may be of the class marketed under the trade name "Micro-switch." During supersonic flight, rearward movement of the head tube 40 by virtue of energization of the motor 59 may move the tube 40 rearwardly through the shock wave W. When this occurs, the tube 40 senses a higher pressure which is transmitted to the chamber 50 and this pressure deflects the diaphragm 49 away from the switch 52 opening the circuit through the line 60 and stopping the motor 59. If the forward end of the head tube 40 moves behind the shock wave W, or if the shock wave moves ahead of the tube by reason of a change in velocity of the craft, a higher pressure is sensed by the tube 40. This increased pressure is transmitted to the chamber 50 and deflects the diaphragm 49 to close the switch 53 energizing the motor 59. The motor 59, energized through the power line 61, rotates the threaded extension 63 to advance the tube 40 into its equilibrium position in the shock wave W.

From the foregoing it will be seen that the forward end of the head tube 40 is automatically maintained in or adjacent the shock wave W during supersonic flight. It is this automatically maintained variable position of the tube 40 that is indicative of the speed of flight and the position of the tube 40 and its associated parts is utilized to govern the instrumentalities which visibly indicate the velocity of flight, control the fuel system, etc.

However, in aircraft, guided missiles, and airplanes, where the attitude of flight is subject to alteration, the above described means 26 for sensing or following the angle of the shock wave W, requires an additive means 27 to compensate for the resultant change in the angle of attack. The above mentioned means 27 serves to automatically preserve a substantially constant or zero angle of attack for the wedge element 25 and thus eliminate errors that would otherwise result from changes in the angle of attack of the craft.

The means 27 includes a pair of static pressure taps or orifices 66 and 67 in the upper and lower surfaces respectively of the wedge element 25 for sensing the angle of attack of the element. Lines or tubes 68 and 69 extend rearwardly from the orifices and are flexible or, at least, their rear portions are flexible. A sealed or closed cell 70 is arranged in the aircraft structure and its interior is divided into two chambers 71 and 72 by a transverse flexible diaphragm 73. The line 68 from the upper orifice 66, has communication with the chamber 71 and the line 79 from the lower orifice communicates with the chamber 73. A switch 74 is arranged at one side of the diaphragm 73 and a similar switch 75 is positioned at the other side of the diaphragm. The switches 74 and 75 may be of the same type as the switches 52 and 53, described above, and are adjustably supported in the cell 70 by means 76 which may be the same as the adjusting means 54—55—56—57 shown in detail in Figure 11. The buttons 77 on the flexible diaphragm 73 serve to actuate the switches 74 and 75 when the diaphragm is flexed from its intermediate undisturbed position. The static pressures at the opposite sides of the wedge element 25 are transmitted to the chambers 71 and 72 by the orifices 66 and 67 and their respective lines 68 and 69. When these static pressures change, owing to a change in the angle of attack of the wedge element 25, the pressures in the diaphragm chambers 71 and 72 become unbalanced and the diaphragm 76 is flexed to close the switch 74 or 75. The two sealed cells 48 and 70 may be mounted on a suitable common support 78, as shown in Figure 2.

The means 27 further includes a reversible electric motor 79 controlled by the switches 74 and 75 and operable to pivot the wedge element 25 on its hinge pins 36 in response to the static pressures received at the orifices 66 and 67. The motor 79 is carried by the pivoted cradle 34 of the wedge element 25 and its shaft carries a jack-screw 80. The screw 80 threadedly operates in a nut 81 which has a pivoted link connection 82 with the aircraft structure. The motor 79 and its jack-screw 80 are spaced rearwardly from the pivotal axis of the cradle 34 and the axis of rotation of the screw is substantially perpendicular to the cradle so that upon rotation of the screw the cradle and the wedge element 25 are pivoted on their hinge pins 36. The switch 74 in the diaphragm chamber 71, controls a forward energizing lead 83 of the motor 79 and the switch 75 is connected in the reversing line 84' of the motor. When the angle of attack of the wedge element 25 changes slightly, the pressure at one side of the element, say the upper side, is greater than at the lower side so that the pressure in the chamber 71 becomes greater than the pressure in the chamber 72. This flexes the diaphragm 73 to close the switch 75 and the motor 79 is energized to pivot the wedge element 25 to a position where the angle of attack is substantially zero. With the angle of attack at zero, the pressures in the chambers 71 and 72 equalize and the diaphragm 73 returns to a neutral position where both switches 74 and 75 are open and the motor 79 is deenergized. It will be readily understood how the means 27 just described operates to automatically maintain the wedge element 25 at the substantially zero angle of attack in response to changes or differentials in the static pressures received at the orifices 66 and 67.

The means 28 for visibly indicating the supersonic Mach number of flight of the craft, serves to receive or respond to the position of the total head tube 40 and to transmit this information to any selected place in the aircraft, converting the information thus transmitted into a visible indication of the Mach number. The means 28 includes a set or pair of synchronous units 84 and 85. The synchronous units may be of the general class known to the trade as "Selsyn," "Autosyn" or "Synchrotie" devices, the unit 84 being in the nature of the generator or transmitter and the unit 85 being the synchromotor or receiver. Such synchronous transmitters and receivers are well known in the art and their details are not believed to be essential to an understanding of the present invention. It is believed that it will suffice to say that each unit 84 and 85 has three stator windings and a rotor winding, the corresponding stator terminals of the two units being connected by electrical connections 86 and the construction and arrangement being such that upon angular movement of the transmitter rotor a set of three single phase voltages is transmitted to the receiver 85 to cause the receiver rotor to turn to the same angular position as the transmitter rotor. When the rotors of the two units 84 and 85 are in the same angular position the stator voltages are opposed and zero current passes between the units but upon angular movement of the transmitter rotor in either direction, an electrical signal comprising the three single phase voltages, is transmitted by the unit 84 through the lines 86 to the stator windings of the unit 85 and the rotor of the unit 85 immediately assumes the same position as the rotor of the transmitter. Power lines 87 and 88 carry energizing current to the rotor windings of the synchronous units 84 and 85.

The synchronous generator or transmitter unit 84 is associated with the total head tube 40 so that a change in the position of the tube is immediately reflected in a corresponding change in the position of the rotor of the transmitter. In the preferred arrangement illustrated, the transmitter unit 84 is coupled with the shaft of the motor 59 through a suitable speed reduction gear unit 91 so that the motor which moves the tube 40 in response to the pressure sensed or received by the tube 40, also moves the rotor of the unit 84 in the same angular direction and in a proportionate manner. The means 28 further includes a dial 88 positioned to be visible to the pilot or engineer and calibrated in terms of Mach number. A hand 89 is movable across the dial in cooperation with its calibrations and the shaft 90 of the hand 89 is connected with the rotor of the receiver unit 85 so that the position of the hand reflects the angular position of the rotors of the two units 84 and 85 and therefore indicates the Mach number of the aircraft as sensed or determined by the movable head tube 40. The meter dial 88 is calibrated according to the angle sensing movements of the tube 40 so that the hand 89 cooperating therewith indicates the true Mach number of flight.

The means 29, which is responsive to or controlled by the means 26 for sensing the angle of the shock wave W, regulates the delivery of fuel to the powerplant P. The means 29 includes a suitable regulating valve 92 interposed in the fuel supply pipe 17 of the powerplant. The valve 92 is actuated by a reversible electric motor 93. A speed reducing gear box 94 is associated with the shaft of the motor 93 and drives a screw shaft 95. The screw shaft 95 in turn operates a nut 96 which is operatively connected with the lever 97 of the valve 92 by a link 98. The forward and reverse energizing leads 99 and 100 of the reversible electric motor 93 extend to two independent halves 101 and 102 of a rheostat, see Figure 6. The rheostat windings 101 and 102 are supported on a disc 103 mounted to rotate or turn with respect to a stationarily supported dial 104. A central shaft 105 supports the disc 103 on the dial for rotation, the rotary mounting being such that the rheostat disc remains stationary until deliberately manually moved. The face of the dial 104 is calibrated in Mach numbers and the rheostat disc 103 has a pointer finger 106 which cooperates with the calibrations. The finger 106 may also form a handle for manually turning the rheostat disc.

The fuel regulating means further includes a synchronous receiver or motor 107 which may be similar to the receiver unit 85 referred to above. Power leads 108 extend to the rotor winding of the receiver unit 107 and electrical conductors 109 are tapped off the above described connections 86 and extend to the stator winding terminals of the unit 107. The synchronous receiver unit 107 serves to drive or turn a rotor 110 which moves across the rheostat windings 101 and 102. A power lead 111 is connected with the brush or rotor 110 to supply energizing current to the motor 93 when the rotor 110 is in engagement with either one of the rheostat windings 101 or 102. The rheostat windings 101 and 102 are spaced apart to leave a dead zone or null point and when the rotor 110 is at this null point the reversible motor 93 is deenergized so that the valve 92 is stationary. However, when a signal is received by the synchronous unit 107 from the transmitter 84, the rotor 110 is moved from the null point to cooperate with one or the other of the rheostat windings 101 or 102 to energize the motor 93 and operate the valve 92. By manually setting or adjusting the finger 106 at a selected Mach number calibration on the dial 104, the means 26, operating through the medium of the synchronous units 84 and 107, will automatically regulate the valve 92 to supply fuel to the powerplant P in sufficient quantity to maintain the Mach number thus selected.

When the craft is flying at the selected Mach number, the rheostat brush or rotor 110 is at the null point between the two rheostat windings 101 and 102. If the velocity of the craft decreases, the means 26 causes the tube 40 to follow the change in the angle of the shock wave W by energizing the motor 59 as previously described. This operation of the motor 59 changes the angular position of the rotor of the synchronous transmitting unit 84 and a signal is transmitted to the receiver unit 107. The rotor of the receiver unit 107 changes position accordingly and the brush or rotor 110 is moved from the null position into contact with the rheostat winding 102. Current then flows through the wire 111, brush 110, winding 102 and line 99 to the motor 93 energizing the motor so that it rotates the screw 95 in the direction to increase the fuel flow through the valve 92, the speed of the motor being dependent upon the position assumed by the brush 110 on the winding 102. The additional flow of fuel to the powerplant P increases the speed or Mach number of the craft and the tube 40 by sensing the change in the angle of the shock wave W, is moved by the motor 59 to follow the shock wave. This energization of the motor 59 is accompanied by actuation of the transmitting unit 84 and a signal is sent to the receiver unit 107 to move the brush 110 to the null point between the rheostat windings 101 and 102 stopping the motor 94 so that the throttle valve 92 is held at the new setting. Conversely an increase in the Mach number of flight of the craft causes the means 26 to transmit a signal to the receiver unit 107 which in turn moves the brush or rotor 110 into cooperation with the rheostat winding 101 and the motor 93 is energized is throttle down the valve 92. As a result, the Mach number of the craft decreases and the angle of the shock wave W changes so that a signal is transmitted to the receiver unit 107 to bring the rotor or brush 110 to the null point. From this it will be seen that the means 29, as controlled by the means 26, automatically regulates the supply of fuel to the powerplant P in accordance with the manual setting of the finger 106 to maintain a selected Mach number of flight.

The means 30, which is controlled by the shock wave sensing means 26, serves to alter the extent of projection of the brake part 20 in accordance with the Mach number of the craft. The means 30 includes a reversible electric motor 120 which drives a lead screw 121 through the medium of a suitable speed reduction gearing 122. The screw 121 in turn operates a nut 124 which is operatively connected with the pivoted brake B through linkage 125. The forward and reverse connections 126 and 127 of the motor 20 extend to rheostat windings 128 and 129. The rheostat windings 128 and 129 are carried by a manually adjustable disc 130 and are adapted to be engaged by a movable brush or rotor 131. The rheostat windings 128 and 129, the disc 130 and the brush 131 may be of the same construction as the windings 101 and 102, the disc 103, and the brush or rotor 110 respectively, described above, and the disc 103 has a manual adjusting finger 132 operating over a dial 133 in the same manner as the finger 106. A lead 135 connects the rotor or brush 131 with the power line so that the motor 120 is energized when the brush is in cooperation with either winding 128 or 129. The means 30 further includes a synchronous motor or receiver 134 for operating the rheostat rotor 131. Leads 136 are tapped into the above described conductors 86 and extend to the stator winding terminals of the receiver unit 134 to carry the synchronous transmitter signals to the receiver and power lines 9 supply the current to receiver rotor.

Where the apparatus includes the fuel supply regulating means 29 as well as the brake regulating means 30, it is desirable to provide a selector switch arrangement so that either one of the means 29 or 30 may be conditioned for operation while the other means 29 or 30 is made idle. Any selected switch system or device may be employed for this purpose. In Figure 10, I have diagrammatically illustrated a single switch S which controls the two sets of electrical conductors 109 and 136 leading to the synchronous receiver units 107 and 120 respectively. This switch includes pairs of spaced contacts 140 connected in the conductors 109 and a similar set of contacts 141 connected in the lines 136. A rotor or shaft 142 has three spaced blades 143 and is manually turnable between the position where the blades 143 cooperate with the contacts 140 to complete the circuit to the receiver unit 107 and the position where the blades 143 cooperate with the contacts 141 to complete the circuit to the receiver unit 120. The full lines in Figure 10 show the blades 143 in cooperation with the contacts 140 of the lines 109 while the broken lines illustrate the blades in engagement with the contacts 141 of the conductors 136. The switch S may also have an "open" position where its blades 143 are out of engagement with both sets of contacts 140 and 141.

The operation of the means 30 is substantially the same as the operation of the means 29 except, of course, that the brake B is moved in response to changes in the Mach number of the craft instead of the valve 92. Assuming that the switch S is in the position where the blades are in engagement with the contacts 141, changes in the axial position of the total head tube 40, effected as above described, are accompanied by signals produced by the synchronous transmitter unit 84 and received by the receiver units 85 and 134. The receiver unit 134 in turn moves the rheostat brush or rotor 131 to cause either forward or reverse actuation of the motor 120 and retraction or projection of the brake part 20. By adjusting the finger 132 to a selected setting, the means 30 operates to obtain the desired action of the brake B.

It is believed that the operation of the apparatus will be readily understood from the foregoing detailed description which includes a description of operation of the several instrumentalities. The means 26, which senses the angle of the supersonic shock wave W, operates through the synchronous transmitter unit 84 to produce signals. These signals are received by the synchronous unit 85 which operates the hand 89 to visibly indicate to the pilot the speed of flight and may also be received either by the receiver unit 107 or the receiver unit 120 which, in turn, regulate the fuel valve 92 and the brake B respectively through the mechanisms above described. These latter mechanisms are manually adjustable by the fingers 106 and 132 to obtain a selected or predetermined action of the powerplant P and brake B.

Having described only a typical embodiment of the invention, I do not wish to be limited to the specific details set forth but reserve to myself any features or modifications that may fall within the scope of the following claims.

I claim as my invention:

1. A device for indicating the Mach number of a supersonic aircraft comprising an element carried by the craft and exposed to the free supersonic air stream, said element creating a shock wave during supersonic flight, the angle of the wave varying with changes in the Mach number of flight, means sensing the variations in the angle of said wave, and an indicating device responsive to said means for indicating the Mach number of flight.

2. A device for indicating the Mach number of flight of a supersonic craft comprising a generally wedge shaped element supported by the craft to have its convergent edge in the free supersonic air stream to create a shock wave, the angle of said wave varying with changes in the Mach number of flight, means sensing the variations in the angle of said wave, and an indicating device responsive to said means for indicating the flight Mach number of the craft.

3. A device for indicating the Mach number of flight of a supersonic craft comprising a generally wedge shaped element, means supporting the element on the craft for pivotal movement in a location where its convergent edge is in the free supersonic air stream to create a shock wave, the angle of the shock wave varying upon change in the Mach number of flight, means responsive to changes in the angle of attack of the element for automatically pivoting the element to maintain the element at a substantially zero angle of attack, means for sensing the angle of said shock wave, and means responsive to said sensing means for indicating the flight Mach number of the craft.

4. A Mach meter for a supersonic aircraft comprising an element having surfaces converging to an edge, means for supporting the element on the craft in a position where said edge faces forwardly in the free air stream to create a shock wave, the angle of said shock wave with respect to the air stream varying with the Mach number of flight, means for sensing the angle of said wave including a head tube, means supporting the tube for movement, and means responsive to the pressure received by the tube for moving the tube to maintain its pressure receiving end in or adjacent the shock wave, and a device responsive to the changes in position of the tube for indicating the flight Mach number of the craft.

5. A Mach meter for a supersonic aircraft comprising an element having surfaces converging to an edge, means for movably supporting the element on the craft to have said edge face forwardly in the free air stream where it creates a shock wave, the angle of said wave with respect to the air stream varying with changes in the Mach number of flight, means for moving said element to maintain the same at a substantially zero angle of attack, a head tube supported for axial movement to have its pressure receiving end in or adjacent the shock wave, means responsive to the pressure received by said tube for moving the tube to maintain its said end in or adjacent the wave, and means actuated in accordance with the position of said tube for indicating the flight Mach number of the craft.

6. A Mach meter for supersonic aircraft comprising an element having surfaces converging to an edge, means for movably supporting the element on the craft to have said edge face forwardly in the free air stream where it creates a shock wave, the angle of said wave with respect to the air stream varying with changes in the Mach number of flight, means responsive to the static pressures at the opposite sides of said edge for moving said element to maintain the same at a substantially zero angle of attack, a head tube supported for axial movement to have its pressure receiving end in or adjacent the shock wave, means responsive to the pressure received by said tube for moving the tube to maintain its said end in or adjacent the wave, and means actuated in accordance with the position of said tube for indicating the flight Mach number of the craft.

7. A device for indicating the flight Mach number of an aircraft comprising an element carried by the craft to be in the free airstream where it creates a shock wave, a movable pressure receiving means for sensing the position of the shock wave, means responsive to the pressure sensed by said pressure sensing means for moving said sensing means to maintain the same at or adjacent the shock wave, and means actuated in accordance with the position of said sensing means for indicating the Mach number of the craft.

8. A device for indicating the flight Mach number of an aircraft comprising an element carried by the craft to be in the free airstream where it creates a shock wave, a movable pressure receiving tube supported to receive the pressure at the shock wave, means responsive to the pressure sensed by said tube for moving the tube to maintain the same at or adjacent the shock wave, and means responsive to the pressure thus received for indicating the flight Mach number of the craft.

9. A device for indicating the flight Mach number of an aircraft comprising an element on the craft in the free air stream for generating a shock wave, means sensing the free air stream indicated total pressure, a movable means for sensing the total pressure at the shock wave, means responsive to the pressures thus sensed for maintaining said movable means at or adjacent the shock wave, and means responsive to the pressures thus sensed for indicating the Mach number of the craft.

10. A device for indicating the flight Mach number of an aircraft comprising an element on the craft in the free air stream for generating a shock wave, means sensing the free air stream indicated total pressure, a movable means for sensing the total pressure at the shock wave, means responsive to the pressures thus sensed for maintaining said movable means at or adjacent the shock wave, and means responsive to the pressures thus sensed for indicating the Mach number of the craft, including a remote indicator, a signal transmitter actuated by the means for maintaining the movable means at the shock wave, and a receiver actuated by the signals from the transmitter for operating the indicator.

11. A device for indicating the flight Mach number of a supersonic craft comprising an element movably mounted on the craft to be in the free air stream where it creates a shock wave, a tube in the free air stream for sensing the indicated air stream total pressure, a movable tube arranged to sense the total pressure at the shock wave, motor means for moving the movable tube, pressure sensitive means responsive to the pressures sensed by said tubes for controlling the motor means so that the latter maintains the movable tube at or adjacent the shock wave, a Mach number indicating meter, means responsive to the action of the motor means and therefore to the position of the movable tube for operating the meter, and means for moving said element to maintain it at the zero angle of attack.

12. A device for indicating the flight Mach number of a supersonic craft comprising an element movably mounted on the craft to be in the free air stream where it creates a shock wave, a tube in the free air stream for sensing the indicated air stream total pressure, a movable tube arranged to sense the total pressure at the shock wave, motor means for moving the movable tube, pressure sensitive means responsive to the pressures sensed by said tubes for controlling the motor means so that the latter maintains the movable tube at or adjacent the shock wave, a Mach number indicating meter, means responsive to the action of the motor means and therefore to the position of the movable tube for operating the meter, and means for moving said element to maintain it at or adjacent the zero angle of attack including motor means for moving the element, means for sensing the static pressures at the opposite sides of the element, and pressure sensitive means responsive to said static pressures for controlling the last named motor means.

13. A device for indicating the flight Mach number of a supersonic craft comprising an element movably mounted on the craft to be in the free air stream where it creates a shock wave, a tube in the free air stream for sensing the indicated air stream total pressure, a movable tube arranged to sense the total pressure at the shock wave, motor means for moving the movable tube, pressure sensitive means responsive to the pressures sensed by said tubes for controlling the motor means so that the latter maintains the movable tube in position to sense the shock wave during changes in the Mach number of flight which change the angle of the wave, a remote Mach number indicating meter, a synchronous transmitter responsive to the position of the motor means and therefore to the position of the movable tube, a synchronous receiver for controlling the meter actuated by signals from the transmitter, and means for moving said element to maintain it at or adjacent the zero angle of attack.

14. In a supersonic aircraft having a powerplant, a valve for controlling the delivery of fuel to the powerplant, an element carried by the craft to be in the free air stream where it creates a shock wave, a movable tube arranged to sense the total pressure at the shock wave, motor means for moving the tube, pressure sensitive means responsive to the pressure sensed by the tube for controlling the motor means to maintain the tube in position to sense the shock wave during changes in the flight Mach number of the craft, and means responsive to the position of the motor means and therefore to the position of the tube for operating said valve.

15. In a supersonic aircraft having a propulsive powerplant, a control for the powerplant for regulating its propulsive action, an element carried by the craft to be in the free air stream where it creates a shock wave, a movable pressure sensing member arranged to sense the total pressure at the shock wave, pressure sensitive means responsive to the pressure sensed by the member for moving the member to maintain it in position to sense the pressure at the shock wave during changes in the flight Mach number of the craft, and means operated in accordance with the position of said member for regulating said control to obtain a given propulsive action of the powerplant.

16. In a supersonic aircraft having a propulsive powerplant, a control for the powerplant for regulating its propulsive action, an element movably carried by the craft to be in the free air stream where it creates a shock wave, a movable pressure sensing member arranged to sense the total pressure at the shock wave, pressure sensitive means responsive to the pressure sensed by the member for moving the member to maintain it in position to sense the pressure at the shock wave during changes in the flight Mach number of the craft, means for moving said element to retain it at a substantially zero angle of attack, and means operated in accordance with the position of said member for regulating said control to obtain a given propulsive action for the powerplant.

17. In a supersonic aircraft, having a powerplant, a valve for controlling the delivery of fuel to the powerplant, an element carried by the craft to be in the free air stream where it creates a shock wave, a movable tube arranged to sense the total pressure at the shock wave, motor means for moving the tube, pressure sensitive means responsive to the pressure sensed by the tube for controlling the motor means to maintain the tube in position to sense the shock wave during changes in the flight Mach number of the craft, a synchronous transmitter unit controlled by the motor means, a synchronous receiver unit controlled by signals from the transmitter unit, and means for operating the valve controlled by the receiver unit to operate the valve in accordance with the position of the motor means and said tube.

18. In a supersonic aircraft having a powerplant, a valve for controlling the delivery of fuel to the powerplant, an element carried by the craft to be in the free air stream where it creates a shock wave, a movable tube arranged to sense the total pressure at the shock wave, motor means for moving the tube, pressure sensitive means responsive to the pressure sensed by the tube for controlling the motor means to maintain the tube in position to sense the shock wave during changes in the flight Mach number of the craft, motor means for operating said valve, means operating in accordance with the position of the first named motor means and therefore with the position of the tube for controlling the second named motor means, and means for manually setting the last mentioned means to obtain a selected speed of flight of the craft.

19. In a supersonic aircraft having a propulsive powerplant, a control for the powerplant for regulating its propulsive action, an element carried by the craft to be in the free air stream where it creates a shock wave, a movable pressure sensing member arranged to sense the total pressure at the shock wave, pressure sensitive means responsive to the pressure sensed by the member for moving the member to maintain it in position to sense the pressure at the shock wave during changes in the flight Mach number of the craft, a Mach number indicator, and means operated in accordance with the position of said member for regulating said control to obtain a given propulsive action of the powerplant and for operating said indicator.

20. In a supersonic aircraft having a propulsive powerplant, a control for the powerplant for regulating its propulsive action, an element carried by the craft to be in the free air stream where it creates a shock wave, a movable pressure sensing member arranged to sense the total pressure at the shock wave, pressure sensitive means responsive to the pressure sensed by the member for moving the member to maintain it in position to sense the pressure at the shock wave during changes in the flight Mach number of the craft, a Mach number indicator, and means operated in accordance with the position of said member for regulating said control to obtain a given propulsive action of the powerplant and for operating said indicator including a synchronous transmitter unit operated by the pressure sensitive means, and a pair of synchronous receiver units coupled with the transmitter unit to operate in synchronism therewith, one of the receiver units controlling said indicator, the other operating said control.

21. In a supersonic aircraft, a brake part projectable variable distances from the craft, an element carried by the craft to be in the free air stream where it creates a shock wave, means for sensing the position of the shock wave during changes in the flight Mach number of the craft including a movable member for sensing the total pressure at the wave, means responsive to the pressure thus sensed by said member for projecting and retracting the brake part in accordance with the Mach number of flight, and means for manually pre-selecting the action of the last named means.

22. In a supersonic aircraft, a brake part projectable variable distances from the craft, an element carried by the craft to be in the free air stream where it creates a shock wave, means for sensing the position of the shock wave including a movable tube arranged to sense the pressure at the wave, motor means for moving the tube, means sensitive to the pressure sensed by the tube for controlling the motor means to maintain the tube at the shock wave, and means for operating the brake part in accordance with the position of said tube.

FRANK A. CLEVELAND, II.

REFERENCES CITED

The following references are of record in the file of this patent:

UNITED STATES PATENTS

| Number | Name | Date |
|---|---|---|
| 1,978,863 | Gregg et al. | Oct. 30, 1934 |
| 2,029,700 | Boykow | Feb. 4, 1936 |
| 2,179,500 | Diehl | Nov. 14, 1939 |
| 2,237,306 | Hood | Apr. 8, 1941 |
| 2,279,615 | Bugatti | Apr. 14, 1942 |
| 2,343,281 | Crane | Mar. 7, 1944 |
| 2,392,443 | Youngman | Jan. 8, 1946 |